(12) United States Patent
Yan et al.

(10) Patent No.: US 10,440,464 B2
(45) Date of Patent: Oct. 8, 2019

(54) METHOD AND APPARATUS FOR ADJUSTING VOLUME, TERMINAL DEVICE AND STORAGE MEDIUM

(71) Applicant: GUANGDONG OPPO MOBILE TELECOMMUNICATIONS CORP., LTD., Dongguan, Guangdong (CN)

(72) Inventors: Fenggui Yan, Dongguan (CN); Zhaoan Xu, Dongguan (CN); Gaoting Gan, Dongguan (CN); Zhiyong Zheng, Dongguan (CN); Hai Yang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/040,203

(22) Filed: Jul. 19, 2018

(65) Prior Publication Data

US 2019/0058939 A1 Feb. 21, 2019

(30) Foreign Application Priority Data

Aug. 18, 2017 (CN) .......................... 2017 1 0710418

(51) Int. Cl.
*H04R 3/00* (2006.01)
*H04R 5/04* (2006.01)
(Continued)

(52) U.S. Cl.
CPC ............ *H04R 1/225* (2013.01); *G06F 3/165* (2013.01); *H04M 1/6016* (2013.01); *H04R 3/00* (2013.01); *H04R 5/04* (2013.01); *H04R 2430/01* (2013.01)

(58) Field of Classification Search
CPC . H04R 1/225; H04R 3/00; H04R 5/04; H04R 2430/01; G06F 3/165; H04M 1/6016
(Continued)

(56) References Cited

U.S. PATENT DOCUMENTS 7,085,387 B1* 8/2006 Metcalf .................... H04R 5/00
369/5
8,116,476 B2* 2/2012 Inohara .................... H04R 5/04
348/E5.099
(Continued)

FOREIGN PATENT DOCUMENTS

CN 1929298 A 3/2007
CN 1964187 A 5/2007
(Continued)

OTHER PUBLICATIONS

International Search Report in international application No. PCT/CN2018/097817, dated Nov. 5, 2018.
(Continued)

*Primary Examiner* — Vivian C Chin
*Assistant Examiner* — Friedrich Fahnert
(74) *Attorney, Agent, or Firm* — Ladas & Parry LLP

(57) ABSTRACT

Disclosed is a method and apparatus for adjusting volume, a terminal device and a storage medium. According to the method, amplitude information of a sound source is acquired if it is detected that a terminal device is playing the sound source. A type of the sound source is determined according to the amplitude information. Volume adjustment information is determined according to the type of the sound source. Volume of the terminal device is adjusted according to the volume adjustment information.

13 Claims, 10 Drawing Sheets

(51) Int. Cl.
*H04R 1/22* (2006.01)
*G06F 3/16* (2006.01)
*H04M 1/60* (2006.01)

(58) Field of Classification Search
USPC .................... 381/61, 72, 94, 104; 700/94
See application file for complete search history.

(56) References Cited

U.S. PATENT DOCUMENTS

| | | | | |
|---|---|---|---|---|
| 9,495,591 | B2* | 11/2016 | Visser | G06K 9/00624 |
| 9,830,931 | B2* | 11/2017 | Butts | G10L 25/51 |
| 9,899,035 | B2* | 2/2018 | Kakadiaris | G10L 25/51 |
| 2004/0141622 | A1* | 7/2004 | Squibbs | H04S 7/40 |
| | | | | 381/61 |
| 2006/0079975 | A1* | 4/2006 | Ozaki | H04H 20/28 |
| | | | | 700/94 |
| 2007/0110260 | A1 | 5/2007 | Hsieh | |
| 2007/0195969 | A1* | 8/2007 | Ding | H04R 1/1091 |
| | | | | 381/72 |
| 2010/0027811 | A1* | 2/2010 | Moon | H03G 3/32 |
| | | | | 381/104 |
| 2016/0056787 | A1 | 2/2016 | Lu et al. | |
| 2017/0230024 | A1 | 8/2017 | Lu et al. | |

FOREIGN PATENT DOCUMENTS

| | | |
|---|---|---|
| CN | 101026363 A | 8/2007 |
| CN | 104079247 A | 10/2014 |
| CN | 104883437 A | 9/2015 |
| CN | 105074822 A | 11/2015 |
| CN | 105632523 A | 6/2016 |
| CN | 106210879 A | 12/2016 |
| CN | 106775568 A | 5/2017 |
| CN | 107040660 A | 8/2017 |
| CN | 107526568 A | 12/2017 |
| KR | 20070074266 A | 7/2007 |
| WO | 2017036559 A1 | 3/2017 |

OTHER PUBLICATIONS

Written Opinion of the International Search Authority in international application No. PCT/CN2018/097817, dated Nov. 5, 2018.
European Search Report in European application No. 18185681.6, dated Dec. 12, 2018.

* cited by examiner

METHOD AND APPARATUS FOR ADJUSTING VOLUME, TERMINAL DEVICE AND STORAGE MEDIUM

CROSS-REFERENCE TO RELATED APPLICATIONS

The present application is based upon and claims priority to Chinese Patent Application No. 201710710418.5, filed on Aug. 18, 2017, the contents of which are hereby incorporated by reference in its entirety.

BACKGROUND

With the popularity of terminal devices, more and more people use the terminal devices to perform various functions to meet their own requirements, for example, reading texts, watching videos, listening to music, playing games or the like. There are shortcomings in volume adjustment when the terminal devices play audio or video, which is required to be improved.

SUMMARY

The disclosure relates to computer technology, and particularly to a method and apparatus for adjusting volume, a terminal device and a storage medium.

The method and apparatus for adjusting volume, the terminal device and the storage medium according to the disclosure may increase efficiency of volume adjustment and reduce power consumption of the terminal device.

In a first aspect, an embodiment of the disclosure proposes a method for adjusting volume. Amplitude information of a sound source is acquired if it is detected that a terminal device is playing the sound source. A type of the sound source is determined according to the amplitude information. Volume adjustment information is determined according to the type of the sound source. Volume of the terminal device is adjusted according to the volume adjustment information.

In a second aspect, an embodiment of the disclosure proposes an apparatus for adjusting volume, including an information acquisition module, a type determination module, an adjustment information determination module and an adjustment module. The information acquisition module is configured to acquire amplitude information of a sound source if it is detected that a terminal device is playing the sound source. The type determination module is configured to determine a type of the sound source according to the amplitude information. The adjustment information determination module is configured to determine volume adjustment information according to the type of the sound source. The adjustment module is configured to adjust volume of the terminal device according to the volume adjustment information.

In a third aspect, an embodiment of the disclosure proposes a terminal device, including a processor, a memory and a computer program stored in the memory and executable by the processor. The processor executes the computer program to implement the method for adjusting volume according to the embodiments of the disclosure.

In a fourth aspect, an embodiment of the disclosure also proposes a storage medium including executable instructions by the terminal device. The executable instructions by the terminal device are configured to perform the method for adjusting volume according to the embodiments of the disclosure upon being executed by the processor of the terminal device.

According to the embodiments of the present disclosure, amplitude information of a sound source is acquired if it is detected that a terminal device is playing the sound source, a type of the sound source is determined according to the amplitude information, volume adjustment information is determined according to the type of the sound source and volume of the terminal device is adjusted according to the volume adjustment information. With the above solution, volume adjustment efficiency is improved and power consumption of the terminal device is reduced.

BRIEF DESCRIPTION OF DRAWINGS

Other features, objects, and advantages of the present disclosure will become more apparent from the detailed description of non-limited embodiments with reference to the following drawings.

DETAILED DESCRIPTION

Figure 1:
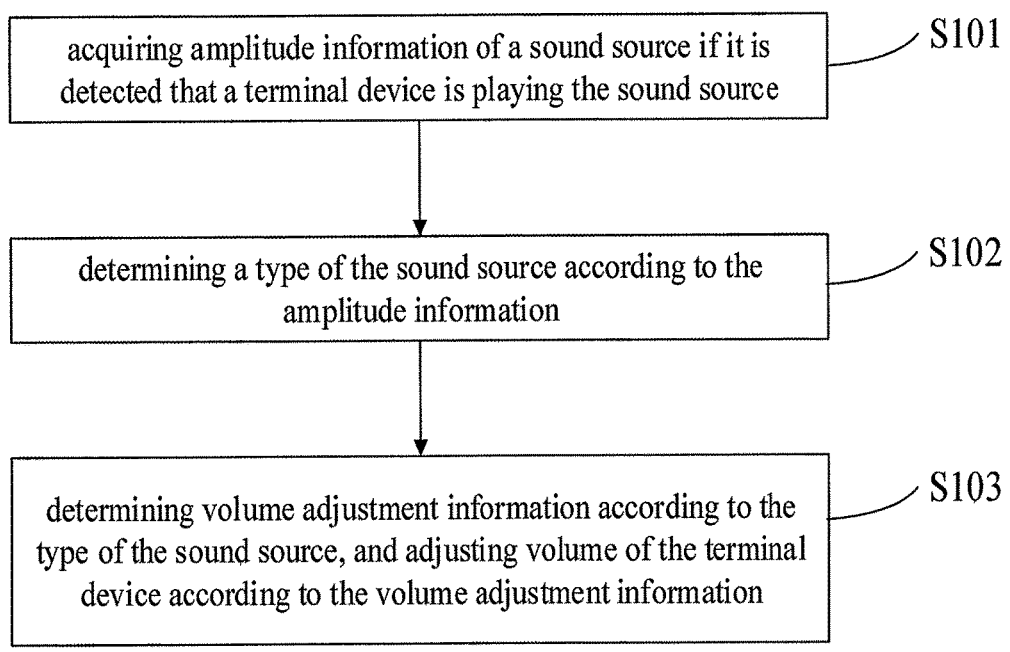
FIG. 1 is a flow diagram of a method for adjusting volume according to an embodiment of the disclosure.

The disclosure will be further described below in detail with reference to the drawings and the embodiments. It should be understood that the specific embodiments described herein serve to explain the disclosure, rather than limiting the disclosure. Moreover, it is noted that for the convenience of description, only the parts relative to the disclosure other than the entirety are shown in the drawings.

FIG. 1 is a flow diagram of a method for adjusting volume according to an embodiment of the disclosure. The present embodiment may apply for volume adjustment of a terminal device playing sounds, for example audio, video, etc. The method may be performed by the terminal device according to the disclosure, and the apparatus for adjusting volume in the terminal device may be implemented by software and/or hardware. The method can include actions in blocks illustrated in FIG. 1.

At block S101, amplitude information of a sound source is acquired if it is detected that the terminal device is playing the sound source.

The terminal device may play the sound source by an installed third-party application or built-in audio and/or video player software. Herein, the operations of acquiring, decoding and outputting the sound source file are mainly involved. Exemplarily, the acquired sound source file may be a multicast stream received from a network, and also may be an audio or video file locally stored in the terminal device. The sound source file is loaded into a memory buffer after the sound source file is acquired. The sound source file loaded in the memory buffer is decoded. Before decoding, audio data and video data are required to be separated if the sound source file includes both audio and video data. The separated audio data is inputted to an audio decoder. Herein, the audio decoder is mainly configured to read audio data in the memory buffer, to obtain digital audio signals and to convert the digital audio signals into analog audio signals. A player of the terminal device plays audio depending on the analog audio signals. In one embodiment, it is determined that the terminal device starts to play a sound source if it is detected that a sound source play event is triggered. Herein, this trigger event may be a detected event that a play button displayed in the touch screen is pressed. Or, it is determined that the terminal device starts to play a sound source if it is detected that the player, for example a loudspeaker, of the terminal device starts to play sound.

In one embodiment, digital audio signals obtained by decoding of the audio decoder may be sampled to acquire amplitude information during a preset period T. Herein, the amplitude information may include multiple amplitude values. An amplitude curve of the sound source played during the preset period T may be determined according to the obtained multiple amplitude values.

At block S102, a type of the sound source is determined according to the amplitude information.

Figure 2:
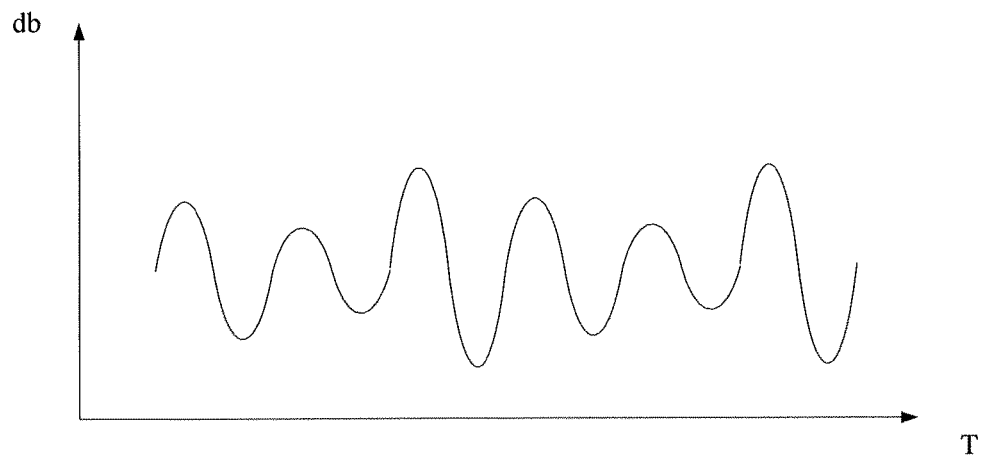
FIG. 2 is a schematic diagram of an amplitude curve corresponding to a sound source of music according to an embodiment of the disclosure.
Figure 3:
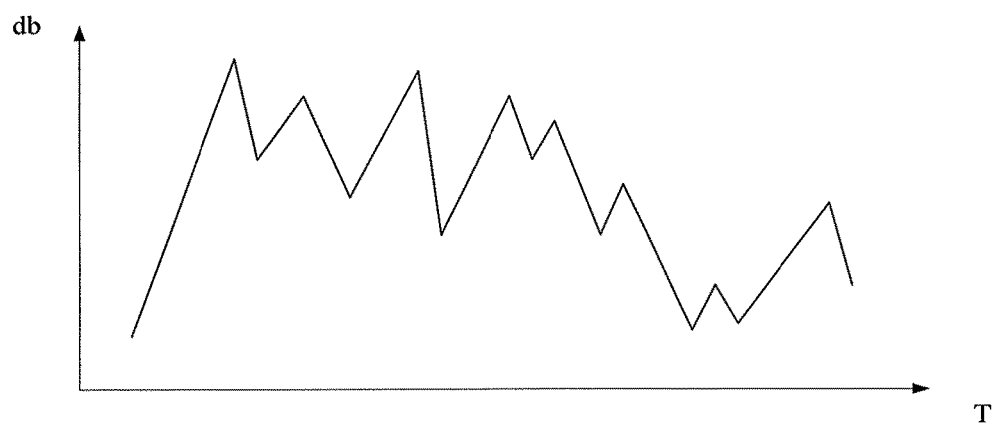
FIG. 3 is a schematic diagram of an amplitude curve corresponding to a sound source of noise according to an embodiment of the disclosure.

An amplitude represents a maximum distance deviated from the original position during vibration of an object. A loudness of a sound heard by one's ears is relative to an amplitude of a sound source. The greater the amplitude is, the stronger the loudness is. In one embodiment, a type of the sound source is determined according to the amplitude information obtained in block S101. In at least one embodiment, the sound source may be the whole audio or video file, or may be clips of the audio or video file. In at least one embodiment, the sound source may be music, such as song files, episodes of the audio or video file or background music included in the audio or video file. The sound source also may be dialogues, for example dialogues between characters in a movie being played, or may be noise, for example noise during a call or noise in movie clips. Herein, the different types of sound sources correspond to different amplitude curves. For example, FIG. 2 is a schematic diagram of an amplitude curve corresponding to a sound source of music according to an embodiment of the disclosure. It can be known in FIG. 2 that a waveform of the amplitude curve corresponding to this sound source is regular. FIG. 3 is a schematic diagram of an amplitude curve corresponding to a sound source of noise according to an embodiment of the disclosure. It can be known in FIG. 3 that the amplitude curve corresponding to noise is random.

At block S103, volume adjustment information corresponding to the type of the sound source is determined, and volume of the terminal device is adjusted according to the volume adjustment information.

In one embodiment, the volume adjustment information may be volume gain adjustment information. Herein, a gain, in decibel, represents a degree of increase (a multiple of amplification) in current, voltage, or power in an element, circuit, device, or system. In at least one embodiment, a gain of the analog audio signal to be outputted may be adjusted by controlling a gain amplifier. Exemplarily, the correspondence between the types of sound sources and the gain adjustment information is shown in the table below:

TABLE 1

| Types of sound sources | Gain adjustment information |
|---|---|
| Music | 3 |
| Dialogues | 1.5 |
| Noise | 0.5 |

Volume of the terminal device is adjusted according to the determined gain adjustment information. For example, if the sound source is determined as music, output gain is increased and volume is increased. If the sound source is determined as noise, the value of the gain is set as a value less than 1 so as to decrease volume of the noise. Thus, sound content desirable and pleasing for a user is amplified, and noise and other noisy sounds are reasonably suppressed when the terminal device plays the sound source.

Figure 4:
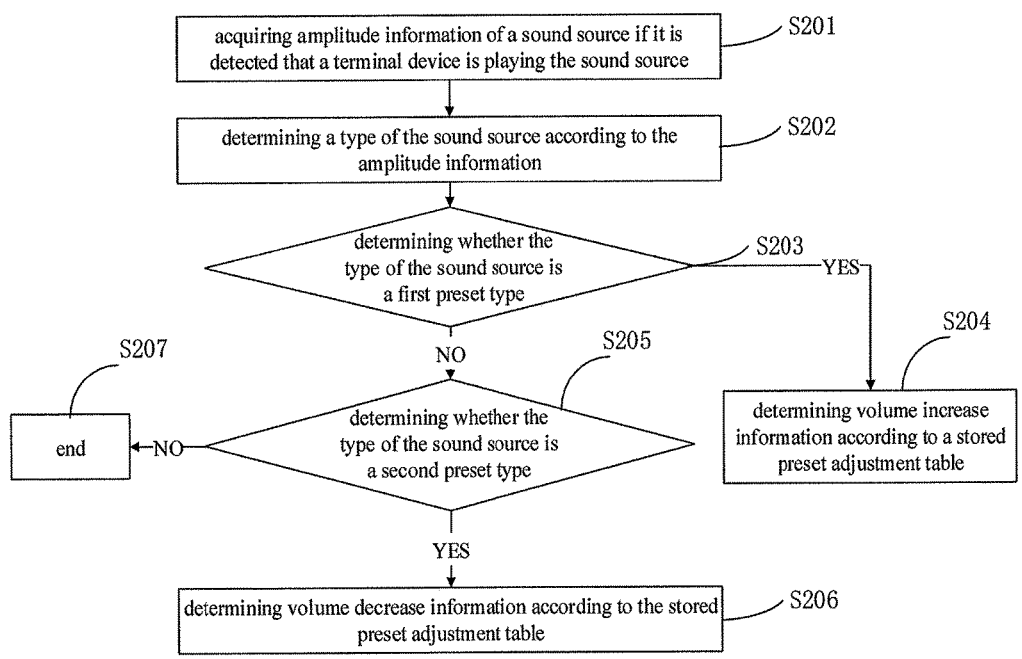
FIG. 4 is a flow diagram of another method for adjusting volume according to an embodiment of the disclosure.

FIG. 4 is a flow diagram of another method for adjusting volume according to an embodiment of the disclosure. Based on the abovementioned embodiments, In at least one embodiment, determining volume adjustment information according to the type of the sound source includes determining volume increase information according to a stored preset adjustment table if the sound source is music or a dialogue; and determining volume decrease information according to the stored preset adjustment table if the sound source is noise.

Based on the above optimization, the method can include actions in blocks illustrated in FIG. 4.

At block S201, amplitude information of a sound source is acquired if it is detected that the terminal device is playing the sound source.

At block S202, a type of the sound source is determined according to the amplitude information.

At block S203, it is determined whether the type of the sound source is a first preset type. If the type of the sound source is the first preset type, block S204 is performed. Otherwise, block S205 is performed.

In one embodiment, the first preset type of sound source may be a type of sound source requiring volume to be increased, for example, music or dialogues of characters in a film or the like. If it is determined the type of the sound source is the first type, block S204 is performed accordingly to increase volume of this sound source.

At block S204, volume increase information is determined according to a stored preset adjustment table.

Herein, the volume increase information is configured to increase volume of the sound source. A level of volume increase may be determined according to information recorded in the stored preset adjustment table. Herein, content of this preset adjustment table may be updated according to the user's settings. That is, a specific value of the volume increase information is determined by the user. In at least one embodiment, the volume increase information may be a default, rather than depending on the preset adjustment table.

At block S205, it is determined whether the type of the sound source is a second preset type. If the type of the sound source is the second preset type, block S206 is performed. Otherwise, block S207 is performed.

In at least one embodiment, the second preset type of the sound source may be noise, which characterizes irregular noisy sound content. No volume adjustment of the sound source is made if the type of the sound source is neither the first preset type nor the second preset type.

At block S206, volume decrease information is determined according to the stored preset adjustment table.

At block S207, the process is ended.

Figure 5:
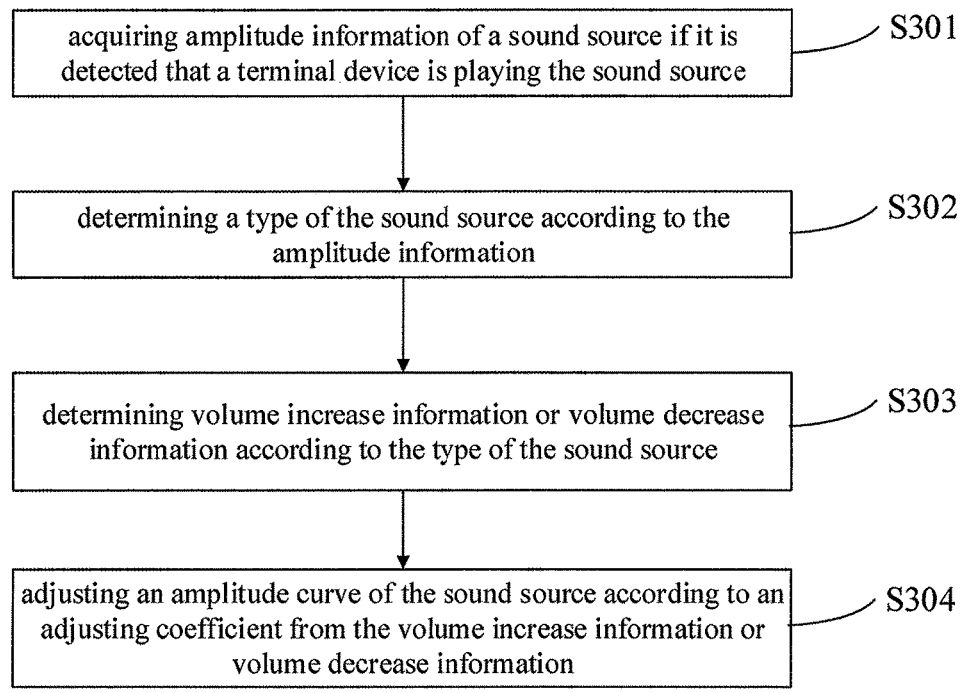
FIG. 5 is a flow diagram of yet another method for adjusting volume according to an embodiment of the disclosure.

In at least one embodiment, a specific volume adjusting manner is proposed. In at least one embodiment, adjusting volume of the terminal device according to the volume adjustment information includes adjusting an amplitude curve of the sound source according to an adjusting coefficient from the volume increase information or volume decrease information. FIG. 5 is a flow diagram of yet another method for adjusting volume according to an embodiment of the disclosure. The method can include actions in blocks illustrated in FIG. 5.

At block S301, amplitude information of a sound source is acquired if it is detected that the terminal device is playing the sound source.

At block S302, a type of the sound source is determined according to the amplitude information.

At block S303, volume increase information or volume decrease information is determined according to the type of the sound source.

At block S304, an amplitude curve of the sound source is adjusted according to an adjusting coefficient from the volume increase information or volume decrease information.

In one embodiment, the volume increase information and volume decrease information correspond to adjusting coefficients of the amplitude curve, respectively. The adjusting coefficient of the amplitude curve is configured to adjust amplitude of the sound source. In at least one embodiment, after the type of the sound source is determined, the sound source file may be parsed, and data characterizing amplitude information in the obtained audio data is modified and then packed. When the data characterizing amplitude information in the audio data is buffered to corresponding sound source file and is played, amplitude of the sound source has been increased. Alternatively, in a decoding process of sound source, the obtained digital audio signals are analyzed to obtain the amplitude data. The amplitude data is multiplied by the corresponding adjusting coefficient to change the amplitude, thereby adjusting volume of the sound source. Thus, it is implemented that volume of the sound source is adjusted without changing original volume of the terminal device. The adjustment may be arranged before the sound source file enters the buffer, thereby reducing play load. Alternatively, it is feasible to adjust the sound source content in the buffer so as to improve adjustment efficiency.

Figure 6:
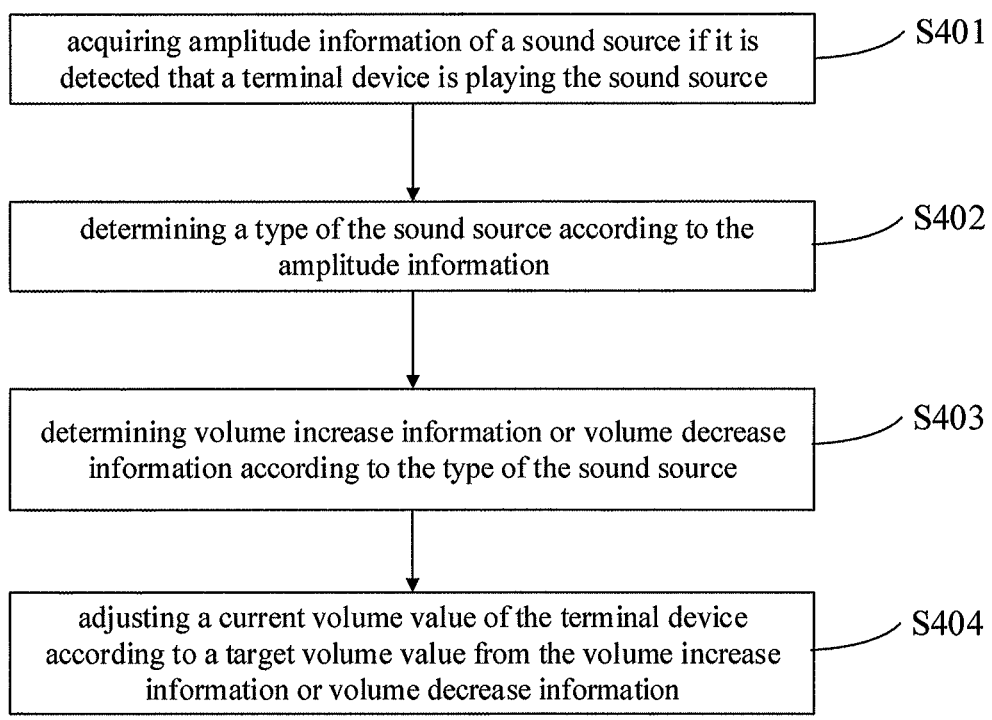
FIG. 6 is a flow diagram of still another method for adjusting volume according to an embodiment of the disclosure.

In at least one alternative embodiment, another specific volume adjusting manner is proposed. In at least one embodiment, adjusting volume of the terminal device according to the volume adjustment information includes adjusting a current volume value of the terminal device according to a target volume value from the volume increase information or volume decrease information. FIG. 6 is a flow diagram of still another method for adjusting volume according to an embodiment of the disclosure. The method can include actions in blocks illustrated in FIG. 6.

At block S401, amplitude information of a sound source is acquired if it is detected that the terminal device is playing the sound source.

At block S402, a type of the sound source is determined according to the amplitude information.

At block S403, volume increase information or volume decrease information is determined according to the type of the sound source.

At block S404, a current volume value of the terminal device is adjusted according to a target volume value from the volume increase information or volume decrease information.

In one embodiment, the volume increase information and volume decrease information correspond to target volume values, respectively. Exemplarily, the terminal device totally has 18 adjustable levels from mute to the maximum volume. Each level corresponds to one volume value. The target volume value corresponding to the volume decrease information may be 3 or 4 whereas the target volume value corresponding to the volume increase information may be 14 or 15. The volume value is accordingly decreased to 3 or 4 if the type of the sound source is determined to be the type requiring volume to be decreased. In at least one embodiment, before adjusting volume according to the target volume value, it is also included determining play duration of the type of the sound source. If the play duration is greater than a preset duration, e.g. 30 s, the manner of adjusting a current volume value of the terminal device according to the target volume value from the volume increase information or volume decrease information is used. Thus, volume adjustment efficiency is further improved and power consumption of the terminal device is reduced.

Figure 7:
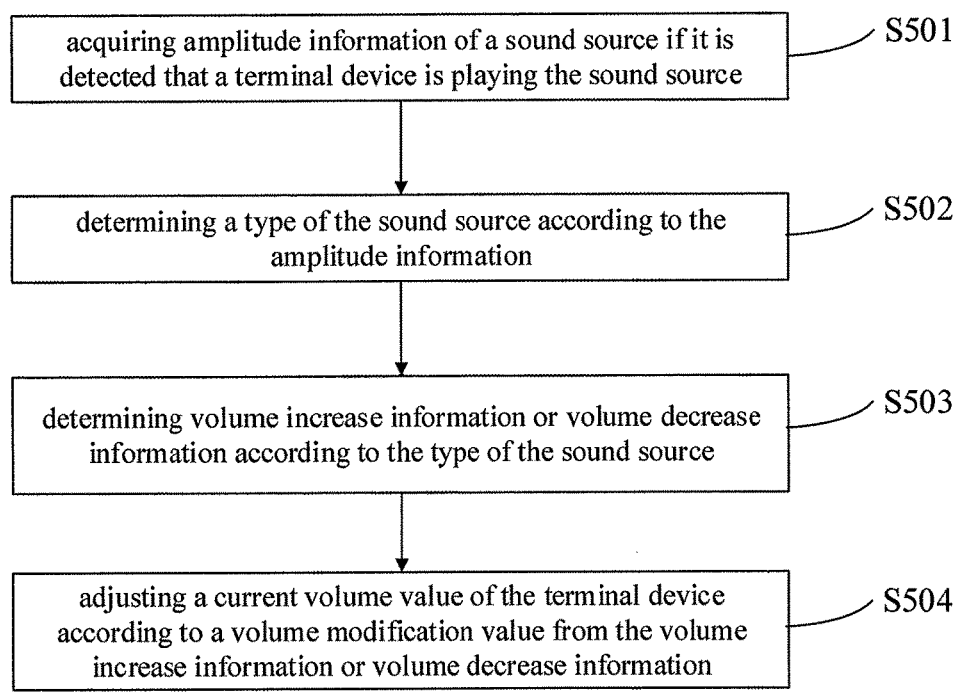
FIG. 7 is a flow diagram of a further method for adjusting volume according to an embodiment of the disclosure.

In at least one embodiment, another specific volume adjustment manner is proposed. In at least one embodiment, adjusting volume of the terminal device according to the volume adjustment information includes adjusting a current volume value of the terminal device according to a volume modification value from the volume increase information or volume decrease information. FIG. 7 is a flow diagram of a further method for adjusting volume according to an embodiment of the disclosure. The method can include actions in blocks illustrated in FIG. 7.

At block S501, amplitude information of a sound source is acquired if it is detected that the terminal device is playing the sound source.

At block S502, a type of the sound source is determined according to the amplitude information.

At block S503, volume increase information or volume decrease information is determined according to the type of the sound source.

At block S504, a current volume value of the terminal device is adjusted according to a volume modification value from the volume increase information or volume decrease information.

In one embodiment, the volume increase information and volume decrease information correspond to volume modification values, respectively. Exemplarily, the terminal device totally has 18 adjustable levels from mute to the maximum volume. Each level corresponds to one volume value. The volume modification value corresponding to the volume increase information or volume decrease information is 3. For example, if the current volume value of the terminal device is 10 and the volume information is required to be increased, then the current volume value is increased by 3, i.e. to play sound with a level of volume 13. If the volume information is required to be decreased, then the current volume value is decreased by 3, i.e. to play sound with a level of volume 7. In at least one embodiment, before adjusting volume according to the volume modification value, it is also included determining play duration of the type of the sound source. If the play duration is greater than a preset duration, e.g. 30 s, the manner of adjusting a current volume value of the terminal device according to the volume modification value from the volume increase information or volume decrease information is used. Thus, volume adjustment efficiency is further improved and power consumption of the terminal device is reduced.

Figure 8:
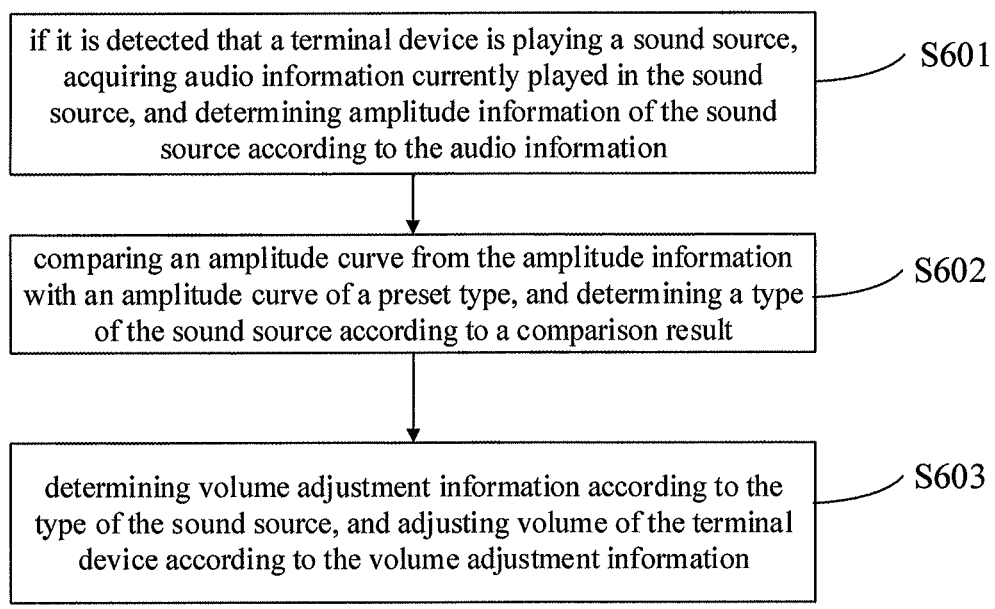
FIG. 8 is a flow diagram of a further method for adjusting volume according to an embodiment of the disclosure.

FIG. 8 is a flow diagram of a further method for adjusting volume according to an embodiment of the disclosure. In at least one embodiment, acquiring amplitude information of the sound source includes acquiring audio information currently played in the sound source, and determining amplitude information of the sound source according to the audio information. Accordingly, determining a type of the sound source according to the amplitude information includes comparing an amplitude curve from the amplitude information with an amplitude curve of a preset type, and determining a type of the sound source according to a comparison result.

As shown in FIG. 8, at block S601, if it is detected that the terminal device is playing a sound source, audio information currently played in the sound source is acquired, and amplitude information of the sound source is determined according to the audio information.

In one embodiment, the audio information currently played, e.g. the audio information already buffered in the buffer, is acquired when audio is being played, and the amplitude information of the sound source is determined according to this audio information.

At block S602, an amplitude curve from the amplitude information is compared with an amplitude curve of a preset type, and a type of the sound source is determined according to a comparison result.

In one embodiment, digital audio signals are obtained by decoding the audio information, and the digital audio signals are sampled to obtain multiple amplitude values, and an amplitude curve is determined according to the amplitude values. The amplitude curve is compared with an amplitude curve of a preset type to determine a type of the sound source. Exemplarily, AI learning is made in advance to the amplitude curves of multiple different sound source types (music, dialogues, and noise, etc.), to obtain the preset amplitude curves. If the acquired amplitude curve of the current sound source conforms to a preset amplitude curve of one certain type, the type of the current sound source is determined.

At block S603, volume adjustment information is determined according to the type of the sound source, and volume of the terminal device is adjusted according to the volume adjustment information.

It is known from the above description that the comparison of the amplitude curve of the sound source and the amplitude curve of a preset type enables the type of the sound source to be determined and the volume to be adjusted, thereby increasing accuracy of determination of the sound source type, and implementing automatic volume adjustment for different sound sources.

Figure 9:
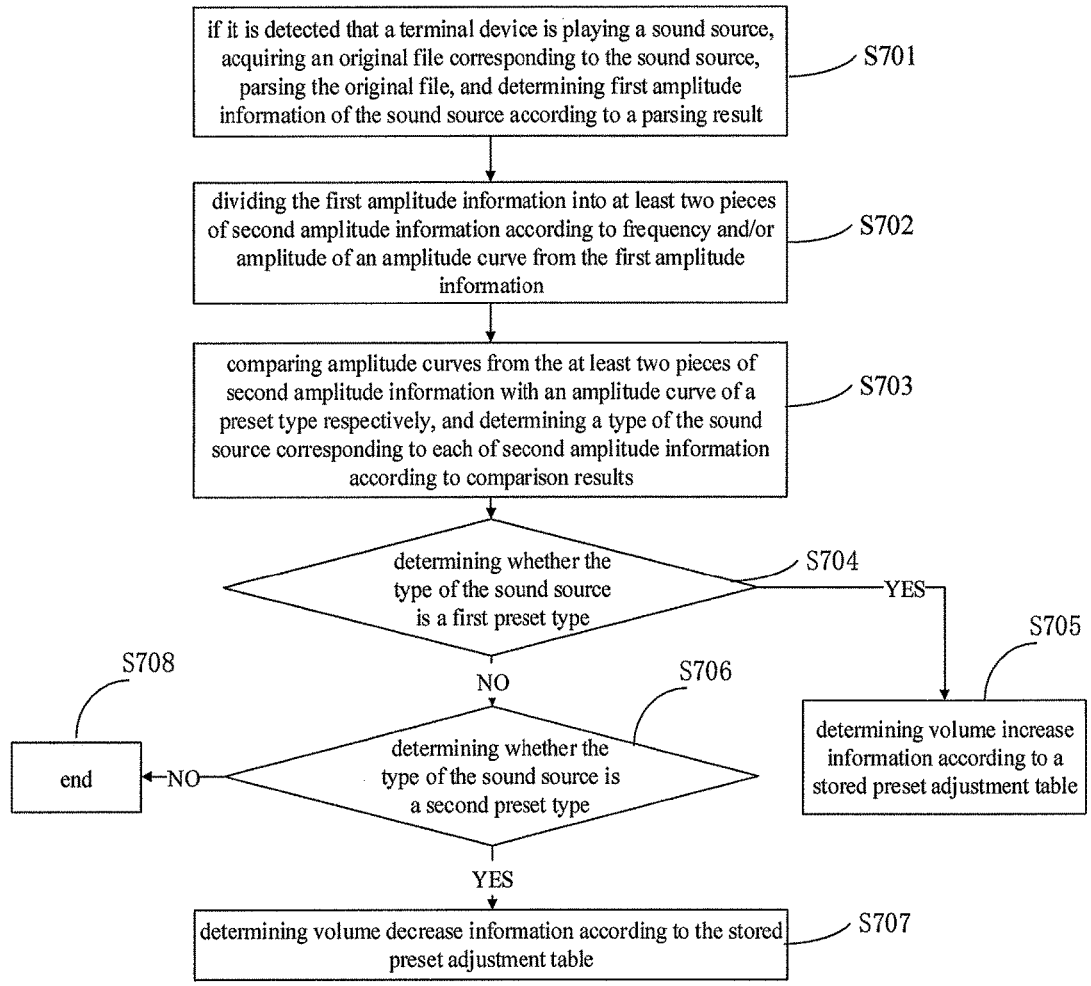
FIG. 9 is a flow diagram of a further method for adjusting volume according to an embodiment of the disclosure.

FIG. 9 is a flow diagram of a further method for adjusting volume according to an embodiment of the disclosure. In at least one embodiment, acquiring amplitude information of the sound source includes acquiring an original file corresponding to the sound source, parsing the original file, and determining first amplitude information of the sound source according to a parsing result; dividing the first amplitude information into at least two pieces of second amplitude information according to frequency and/or amplitude of an amplitude curve from the first amplitude information. Accordingly, determining a type of the sound source according to the amplitude information includes comparing amplitude curves from the at least two pieces of second amplitude information with an amplitude curve of a preset type respectively, and determining a type of the sound source corresponding to each of second amplitude information according to comparison results.

Specifically, as shown in FIG. 9, at block S701, if it is detected that the terminal device is playing a sound source, an original file corresponding to the sound source is acquired, the original file is parsed, and first amplitude information of the sound source is determined according to a parsing result.

Herein, the original file may be a sound source file stored in the terminal device, and a process of parsing the original file involves decoding the original file by a decoder to determine the corresponding first amplitude information.

At block S702, the first amplitude information is divided into at least two pieces of second amplitude information according to frequency and/or amplitude of an amplitude curve from the first amplitude information.

In one embodiment, the first amplitude information may include various types of sound sources at the same time, e.g. music at first and then noise and at last dialogues of characters. As such, the first amplitude information is divided according to features of amplitude curves of different sound source types. That is, the original sound source file is divided into fine sound sources with different types, and then a type matching is made to each of fine sound sources to determine the final volume increasing/decreasing.

At block S703, amplitude curves from the at least two pieces of second amplitude information are compared with an amplitude curve of a preset type respectively, and a type of the sound source corresponding to each of second amplitude information is determined according to comparison results.

A specific comparison process may refer to block S602, and will not be repeated herein.

At block S704, it is determined whether the type of the sound source is a first preset type. If yes, block S705 is performed; otherwise, block S706 is performed.

At block S705, volume increase information is determined according to a stored preset adjustment table.

At block S706, it is determined whether the type of the sound source is a second preset type. If yes, block S707 is performed; otherwise, block S708 is performed.

At block S707, volume decrease information is determined according to the stored preset adjustment table.

At block S708, the process is ended.

It is known from the above description that the analysis of amplitudes of the sound sources and corresponding volume adjustment for different sound source types makes the effect of playing the sound source better, thereby better satisfying the requirements of users.

Figure 10:
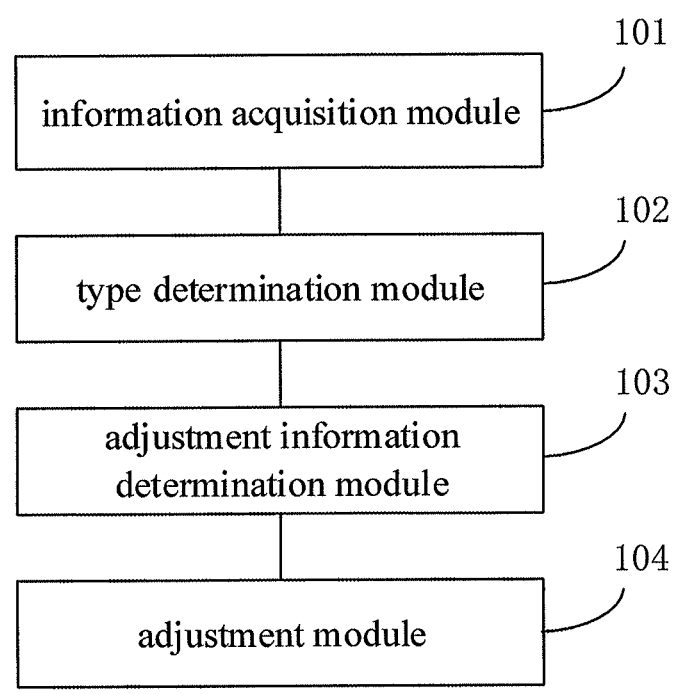
FIG. 10 is a structural block diagram of an apparatus for adjusting volume according to an embodiment of the disclosure.

FIG. 10 is a structural block diagram of an apparatus for adjusting volume according to an embodiment of the disclosure. The apparatus is used for performing the method for adjusting volume according to the abovementioned embodiments. The apparatus is provided with corresponding functional modules for performing the method and has beneficial effects. As shown in FIG. 10, the apparatus specifically includes an information acquisition module 101, a type determination module 102, an adjustment information determination module 103 and an adjustment module 104.

Herein, the information acquisition module 101 is configured to acquire amplitude information of a sound source if it is detected that a terminal device is playing the sound source.

The terminal device may play the sound source by third-party applications installed or built-in audio and/or video player software. Herein, the operations of acquiring, decoding and outputting the sound source file are mainly involved. Exemplarily, the acquired sound source file may be a multicast stream received from a network, and also may be an audio or video file locally stored in the terminal device. The sound source file is loaded into memory buffer after the sound source file is acquired. The sound source file loaded into the memory buffer is decoded. Before decoding, audio and video data are required to be separated if the sound source file includes both audio and video data. The separated audio data is inputted to an audio decoder. Herein, the audio decoder is mainly configured to read audio data in the memory buffer, to obtain digital audio signals and to convert the digital audio signals into analog audio signals. A player of the terminal device plays audio depending on the analog audio signals. In one embodiment, it is determined that the terminal device starts to play a sound source if it is detected that a sound source play event is triggered. Herein, the triggering event may be a detected event that a play button displayed in the touch screen is pressed. Or, it is determined that the terminal device starts to play a sound source if it is detected that the player, for example a loudspeaker, of the terminal device starts to play sound.

In one embodiment, digital audio signals obtained by decoding of the audio decoder may be sampled so as to acquire amplitude information during a preset period T. Herein, the amplitude information may include multiple amplitude values. An amplitude curve of the sound source played during the preset period T may be determined according to the obtained multiple amplitude values.

The type determination module 102 is configured to determine a type of the sound source according to the amplitude information.

An amplitude represents a maximum distance deviated from the original position during vibration of an object. A loudness of a sound heard by one's ears is relative to an amplitude of a sound source. The greater the amplitude is, the stronger the loudness is. In one embodiment, a type of the sound source is determined according to the amplitude information obtained in block S101. In at least one embodiment, the sound source may be the whole audio or video file, or may be clips of the audio or video file. In at least one embodiment, the sound source may be music, such as song files, episodes of the audio or video file or background music included in the audio or video file. The sound source also may be dialogues, for example dialogues between characters in a movie being played, or may be noise, for example noise during a call or noise in movie clips.

The adjustment information determination module 103 is configured to determine volume adjustment information according to the type of the sound source. The adjustment module 104 is configured to adjust volume of the terminal device according to the volume adjustment information.

According to the embodiments of the present disclosure, amplitude information of a sound source is acquired if it is detected that a terminal device is playing the sound source, a type of the sound source is determined according to the amplitude information, volume adjustment information is determined according to the type of the sound source and volume of the terminal device is adjusted according to the volume adjustment information. With the above solution, volume adjustment efficiency is improved and power consumption of the terminal device is reduced.

In at least one embodiment, the information acquisition module is specifically configured to acquire audio information currently played in the sound source, and determine amplitude information of the sound source according to the audio information. The type determination module is specifically configured to compare an amplitude curve from the amplitude information with an amplitude curve of a preset type, and determine a type of the sound source according to a comparison result.

In at least one embodiment, the information acquisition module is specifically configured to acquire an original file corresponding to the sound source, parse the original file, and determine first amplitude information of the sound source according to a parsing result; and to divide the first amplitude information into at least two pieces of second amplitude information according to frequency and/or amplitude of an amplitude curve from the first amplitude information. The type determination module is specifically configured to compare amplitude curves from the at least two pieces of second amplitude information with an amplitude curve of a preset type respectively, and determine the type of the sound source corresponding to each of second amplitude information according to comparison results.

In at least one embodiment, the type determination module is specifically configured to determine volume increase information according to a stored preset adjustment table if the sound source is music or dialogues; and to determine volume decrease information according to the stored preset adjustment table if the sound source is noise.

In at least one embodiment, the adjustment module is specifically configured to adjust an amplitude curve of the sound source according to an adjusting coefficient from the volume increase information or volume decrease information.

In at least one embodiment, the adjustment module is specifically configured to adjust a current volume value of the terminal device according to a target volume value from the volume increase information or volume decrease information.

In at least one embodiment, the adjustment module is specifically configured to adjust a current volume value of the terminal device according to a volume modification value from the volume increase information or volume decrease information.

Figure 11:
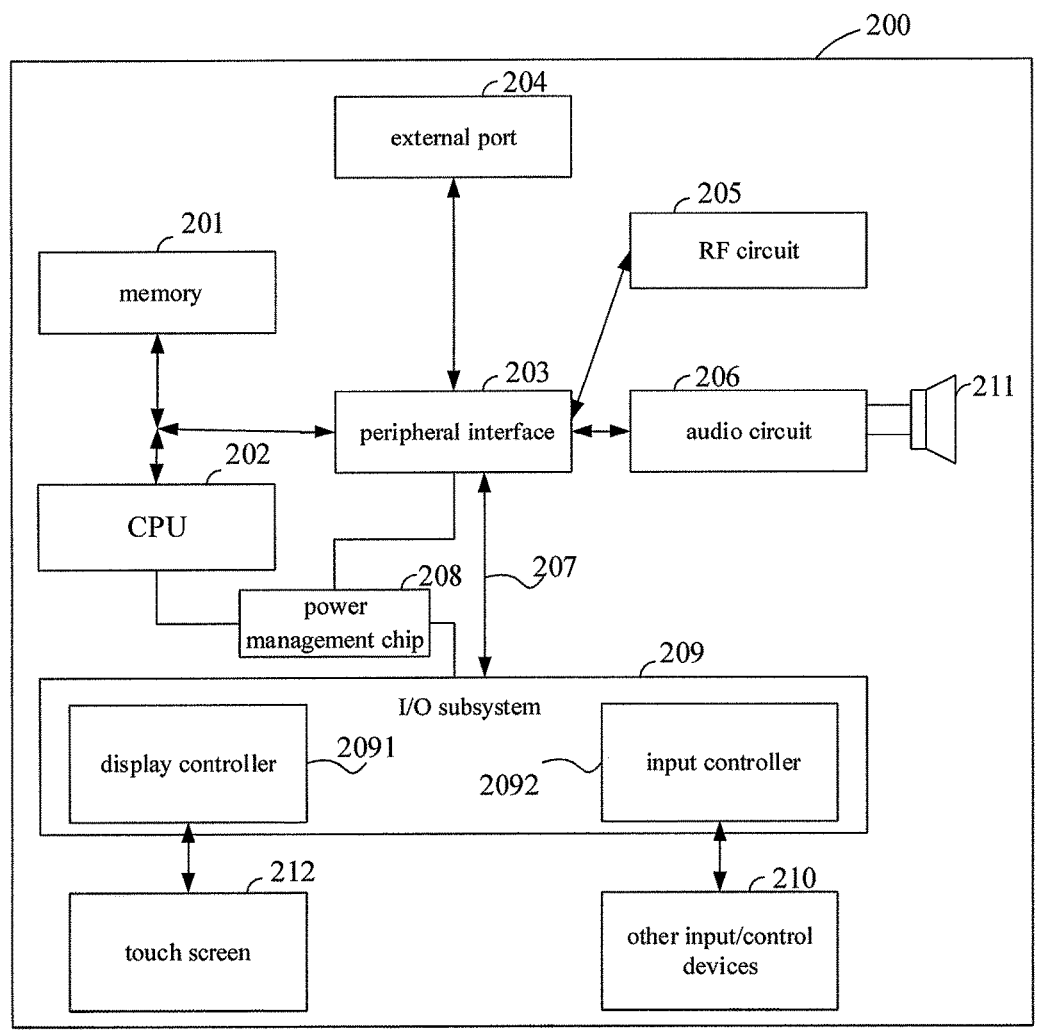
FIG. 11 is a structural schematic diagram of a terminal device according to an embodiment of the disclosure.

The present embodiment proposed a terminal device based on the abovementioned embodiments. FIG. 11 is a structural schematic diagram of a terminal device according to an embodiment of the disclosure. As shown in FIG. 11, this terminal device 200 includes a memory 201, a Central Processing Unit (CPU) 202, a peripheral interface 203, a RF (Radio Frequency) circuit 205, an audio circuit 206, a loudspeaker 211, a power management chip 208, an input/output (I/O) subsystem 209, a touch screen 212, other input/control devices 210 and an external port 204, all of which communicate with each other through at least one communication bus or signal line 207.

It should be understood that, the terminal device 200 shown is an example of a terminal device. The terminal device 200 may be provided with more or less components than that shown in the drawing since two or more components may be combined, or different components may be arranged. Various components shown in the drawing may be implemented in the form of hardware including at least one signal processing circuit and/or dedicated integrated circuit, software, or a combination of hardware and software.

The terminal device used for adjusting volume according to the present embodiment will be described in detail below. The terminal device is a mobile phone for example.

The memory 201 may be accessed by CPU 202, the peripheral interface 203, etc. The memory 201 may include a high-speed random access memory, and may also include a non-volatile memory, for example at least one disk storage, flash memory, or other non-volatile solid-state storages.

The peripheral interface 203 may connect the input and output peripherals of the device to CPU 202 and the memory 201.

The I/O subsystem 209 may connect the input and output peripherals of the device, for example the touch screen 212 and other input/control devices 210, to the peripheral interface 203. The I/O subsystem 209 may include a display controller 2091 and at least one input controller 2092 for controlling other input/control devices 210. Herein, the at least one input controller 2092 receives electrical signals from other input/control devices 210 or transmits electrical signals to other input/control devices 210. Other input/control devices 210 may include a physical button (a press button, a rocker button, etc.), a dial, a slide switch, a joystick, a click wheel. It is noted that the input controller 2092 may be connected with any one of a keyboard, an infrared port, an USB interface, and a pointing device such as a mouse.

The touch screen 212 is the input/output interface between a user terminal and a user for displaying visual output for the user. The visual output may include graphics, texts, icons, videos, etc.

The display controller 2091 in the I/O subsystem 209 receives electrical signals from the touch screen 212 or transmits electrical signals to the touch screen 212. The touch screen 212 detects touch on the touch screen. The display controller 2091 converts the detected touch into interactions with user interface objects displayed on the touch screen 212, i.e. to implement human-computer interaction. The user interface objects displayed on the touch screen 212 may be an icon for running a game, an icon for networking to the relevant network, etc. It is noted that, the device may also include an optical mouse, which is a touch-sensitive surface without displaying visual output, or an extension of a touch-sensitive surface formed by the touch screen.

The RF circuit 205 is mainly configured to establish communication between a mobile phone and a wireless network (i.e. the network side) so as to implement data reception and transmission between the mobile phone and the wireless network, such as receiving or transmitting messages, emails, etc. Specifically, the RF circuit 205 receives and transmits RF signals, also referred to as electromagnetic signals. The RF circuit 205 converts electrical signals into electromagnetic signals or converts electromagnetic signals into electrical signals, and communicates with a communication network or other devices by means of these electromagnetic signals. The RF circuit 205 may include known circuits below listed for performing these functions, including but not limited to an antenna system, a RF transceiver, at least one amplifiers, a tuner, at least one oscillators, a digital signal processor, a CODEC (COder-DECoder, codec) chipset, a Subscriber Identity Module (SIM) or the like.

The audio circuit 206 is mainly configured to receive audio data from the peripheral interface 203, convert the audio data into electrical signals, and transmit the electrical signals to the loudspeaker 211.

The loudspeaker 211 is configured to restore the voice signals received from the wireless network by the mobile phone by means of the RF circuit 205 into voice and to play the voice for the user.

The power management chip 208 is configured to provide the CPU 202, the I/O subsystem and hardware connected to the peripheral interface with power supply, and to manage power supply.

The apparatus for adjusting volume of the terminal device and the terminal device proposed in the abovementioned embodiments may perform the method for adjusting volume for the terminal device proposed in any embodiments of the disclosure, provided with corresponding functional modules for performing this method, and may obtain beneficial effects. For the technical details not illustrated in the abovementioned embodiments, reference may be made to the method for adjusting volume for the terminal device proposed in any embodiments of the disclosure.

A storage medium including executable instructions by the terminal device is also proposed according to an embodiment of the disclosure. The executable instructions by the terminal device are configured to perform a method for adjusting volume upon being executed by the processor of the terminal device. The method includes acquiring amplitude information of a sound source if it is detected that the terminal device is playing the sound source; determining a type of the sound source according to the amplitude information, and determining volume adjustment information according to the type of the sound source; and adjusting volume of the terminal device according to the volume adjustment information.

In at least one embodiment, acquiring amplitude information of the sound source includes acquiring audio information currently played in the sound source, and determining amplitude information of the sound source according to the audio information.

Accordingly, determining a type of the sound source according to the amplitude information includes comparing an amplitude curve from the amplitude information with an amplitude curve of a preset type, and determining a type of the sound source according to a comparison result.

In at least one embodiment, acquiring amplitude information of the sound source includes acquiring an original file corresponding to the sound source, parsing the original file, and determining first amplitude information of the sound source according to a parsing result; and dividing the first amplitude information into at least two pieces of second amplitude information according to frequency and/or amplitude of an amplitude curve from the first amplitude information.

Accordingly, determining a type of the sound source according to the amplitude information includes comparing amplitude curves from the at least two pieces of second amplitude information with an amplitude curve of preset type respectively, and determining the type of the sound source corresponding to each of second amplitude information according to comparison results.

In at least one embodiment, determining volume adjustment information according to the type of the sound source includes determining volume increase information according to a stored preset adjustment table if the sound source is music or dialogues; and determining volume decrease information according to the stored preset adjustment table if the sound source is noise.

In at least one embodiment, adjusting volume of the terminal device according to the volume adjustment information includes adjusting an amplitude curve of the sound source according to an adjusting coefficient from the volume increase information or volume decrease information.

In at least one embodiment, adjusting volume of the terminal device according to the volume adjustment information includes adjusting a current volume value of the terminal device according to a target volume value from the volume increase information or volume decrease information.

In at least one embodiment, adjusting volume of the terminal device according to the volume adjustment information includes adjusting a current volume value of the terminal device according to a volume modification value from the volume increase information or volume decrease information.

A storage medium is any one of various types of memory devices or storage devices. The term of "storage medium" is intended to include an installation medium, such as a CD-ROM, a floppy disk or a tape device; a computer system memory or a random access memory, such as DRAM, DDR RAM, SRAM, EDO RAM, Rambus RAM, etc.; a non-volatile memory, such as a flash memory, a magnetic medium (for example a hard disk or optical storage); a register or other memory elements of similar types, etc. A storage medium may also include other types of memories or a combination thereof. Moreover, a storage medium may be located in a first computer system in which a program is executed, or may be located in a different second computer system. The second computer system is connected to the first computer system via a network (such as internet). The second computer system may provide program instructions to the first computer system for execution. The term of "storage medium" may include two or more storage mediums located in different positions (for example in different computer systems connected by a network). A storage medium may store program instructions (for example, specifically implemented as computer programs) executed by at least one processor.

Certainly, the storage medium according to an embodiment of the disclosure includes computer-executable instructions and the computer-executable instructions are not limited to operations for the abovementioned method for adjusting volume, but may also perform relative operations in the method for adjusting volume according to any embodiment of the disclosure.

It is noted that preferred embodiments of the disclosure and applied technical principles are only described above. It should be understood by those skilled in the art that, the disclosure is not limited to the specific embodiments herein, various significant modifications, readjustments and alternatives may be made by those skilled in the art without departing from the scope of the disclosure. Therefore, although the disclosure has been described in detail with reference to the abovementioned embodiments, the disclosure is not limited to the abovementioned embodiments. Other more equivalent embodiments may also be incorporated without departing from the concept of the disclosure, and the scope of the disclosure is defined by appended claims.

The invention claimed is:

1. A method for adjusting volume, comprising:
acquiring amplitude information of a sound source when it is detected that a terminal device is playing the sound source;
determining a type of the sound source according to the amplitude information;
determining volume adjustment information according to the type of the sound source; and
adjusting volume of the terminal device according to the volume adjustment information,
wherein determining the volume adjustment information according to the type of the sound source comprises:
determining volume increase information according to a preset adjustment table when the sound source is music or dialogues; and
determining volume decrease information according to the preset adjustment table when the sound source is noise,
wherein adjusting the volume of the terminal device according to the volume adjustment information comprises:
adjusting an amplitude curve of the sound source according to an adjusting coefficient from one of the volume increase information and the volume decrease information.

2. The method according to claim 1, wherein acquiring the amplitude information of the sound source comprises:
acquiring audio information currently played in the sound source; and
determining the amplitude information of the sound source according to the audio information, and
wherein determining the type of the sound source according to the amplitude information comprises:
comparing the amplitude curve from the amplitude information with an amplitude curve of a preset type; and
determining the type of the sound source according to a comparison result.

3. The method according to claim 1, wherein acquiring the amplitude information of the sound source comprises:
acquiring an original file corresponding to the sound source;
parsing the original file;
determining first amplitude information of the sound source according to a parsing result; and
dividing the first amplitude information into at least two pieces of second amplitude information according to at least one of frequency or amplitude of an amplitude curve from the first amplitude information, and
wherein determining the type of the sound source according to the amplitude information comprise:
comparing amplitude curves from the at least two pieces of second amplitude information with an amplitude curve of a preset type; and
determining the type of the sound source corresponding to each of second amplitude information according to comparison results.

4. The method according to claim 1, wherein adjusting the volume of the terminal device according to the volume adjustment information comprises:
adjusting a current volume value of the terminal device according to a target volume value from one of the volume increase information and the volume decrease information.

5. The method according to claim 1, wherein adjusting the volume of the terminal device according to the volume adjustment information comprises:
adjusting a current volume value of the terminal device according to a volume modification value from one of the volume increase information and the volume decrease information.

6. The method according to claim 1, further comprising: before adjusting the volume of the terminal device according to the volume adjustment information, determining that duration of playing the sound source is longer than a preset period.

7. A terminal device, comprising a processor and a memory, wherein the memory is configured to store instructions, when executed by the processor, causing the processor to implement the operations of:
- acquiring amplitude information of a sound source when it is detected that the terminal device is playing the sound source;
- determining a type of the sound source according to the amplitude information;
- determining volume adjustment information according to the type of the sound source; and
- adjusting volume of the terminal device according to the volume adjustment information,
- wherein the operation of determining the volume adjustment information according to the type of the sound source comprises:
  - determining volume increase information according to a preset adjustment table when the sound source is music or dialogues; and
  - determining volume decrease information according to the preset adjustment table when the sound source is noise,
- wherein the operation of adjusting the volume of the terminal device according to the volume adjustment information comprises:
  - adjusting an amplitude curve of the sound source according to an adjusting coefficient from one of the volume increase information and the volume decrease information.

8. The terminal device according to claim 7, wherein the operation of acquiring the amplitude information of the sound source comprises:
- acquiring audio information currently played in the sound source; and
- determining the amplitude information of the sound source according to the audio information, and
- wherein the operation of determining the type of the sound source according to the amplitude information comprises:
  - comparing the amplitude curve from the amplitude information with an amplitude curve of a preset type; and
  - determining the type of the sound source according to a comparison result.

9. The terminal device according to claim 7, wherein the operation of acquiring the amplitude information of the sound source comprises:
- acquiring an original file corresponding to the sound source;
- parsing the original file;
- determining first amplitude information of the sound source according to a parsing result; and
- dividing the first amplitude information into at least two pieces of second amplitude information according to at least one of frequency or amplitude of an amplitude curve from the first amplitude information, and
- wherein the operation of determining the type of the sound source according to the amplitude information comprises:
  - comparing amplitude curves from the at least two pieces of second amplitude information with an amplitude curve of a preset type; and
  - determining the type of the sound source corresponding to each of second amplitude information according to comparison results.

10. The terminal device according to claim 7, wherein the operation of adjusting the volume of the terminal device according to the volume adjustment information comprises:
- adjusting a current volume value of the terminal device according to a target volume value from one of the volume increase information and the volume decrease information.

11. The terminal device according to claim 7, wherein the operation of adjusting the volume of the terminal device according to the volume adjustment information comprises:
- adjusting a current volume value of the terminal device according to a volume modification value from one of the volume increase information and the volume decrease information.

12. The terminal device according to claim 7, before the operation of adjusting the volume of the terminal device according to the volume adjustment information, wherein the operations further comprises: determining that duration of playing the sound source is longer than a preset period.

13. A non-transitory computer-readable storage medium having stored herein executable instructions by a processor of a terminal device, wherein the executable instructions, when being executed, are configured to:
- acquire amplitude information of a sound source when it is detected that a terminal device is playing the sound source;
- determine a type of the sound source according to the amplitude information;
- determine volume adjustment information according to the type of the sound source; and
- adjust volume of the terminal device according to the volume adjustment information,
- wherein the operation of determining the volume adjustment information according to the type of the sound source comprises:
  - determining volume increase information according to a preset adjustment table when the sound source is music or dialogues; and
  - determining volume decrease information according to the preset adjustment table when the sound source is noise,
- wherein the operation of adjusting the volume of the terminal device according to the volume adjustment information comprises:
  - adjusting the amplitude curve of the sound source according to an adjusting coefficient from one of the volume increase information and the volume decrease information.

* * * * *